United States Patent [19]

Alkemade

[11] 4,022,220

[45] May 10, 1977

[54] CUTTER HEAD FOR A MACHINE FOR PICKING SPROUTS

[76] Inventor: Antonius Johannes Cornelus Alkemade, Herenweg 1, Noordwijk, Netherlands

[22] Filed: Nov. 18, 1975

[21] Appl. No.: 633,093

[30] Foreign Application Priority Data

Jan. 28, 1975 Netherlands ............... 7500956

[52] U.S. Cl. ............................ 130/30 R; 99/637; 130/9 B
[51] Int. Cl.² ........................................ A01D 55/22
[58] Field of Search ............ 130/30 R, 30 B, 9 B, 130/9 A, 5 R, 5 K; 99/637, 638, 639

[56] References Cited

UNITED STATES PATENTS 1,975,374  10/1934  Hansen .......................... 130/9 B 3,410,272  11/1968  Van Den Hemel ............. 130/30 R Primary Examiner—J.N. Eskovitz
Attorney, Agent, or Firm—Miller & Prestia

[57] ABSTRACT

A cutter head for a machine for picking sprouts, comprising a rotatably mounted disc, which is driven during operation, said disc being provided with an opening for shifting therein a stalk to be picked and with knives positioned around the opening and pivotally connected to the disc, and closing elements, which, when no stalk is present in the cutter head, close the opening for the greater part and are moved outwardly by a shifted-in stalk, by which displacement the knives positioned in front of the closing elements are swung toward the stalk, the connection between the closing elements and the knives comprising arm members and coiled tension springs adapted to actuate a chain-sprocket drive system that provides for pivotal movement of the knives.

12 Claims, 6 Drawing Figures

CUTTER HEAD FOR A MACHINE FOR PICKING SPROUTS

The invention relates to a cutter head for a machine for picking sprouts comprising a disc, which is rotatably positioned with respect to an axis which si perpendicular to the plane of the disc, said disc being rotated when the machine is in operation, and said disc being provided with a central opening into which a stalk of a sprouts cabbage to be picked can be shifted, and with knives provided around the opening, said knives being present on elements which are pivotally connected to the disc, said knives, after shifting one end of a stalk into the opening of the disc, being moved towards the stalk by operating means to cut the sprouts from it when the stalk is shifted further into the opening.

With conventionally known cutter heads of this type, said disc, when the machine is in operation, is continuously driven and, before a stalk of a cabbage to be picked is shifted into it, a part which rotates together with the disc is braked. By said braking action the part in question will rotate with respect to the disc and by said rotation the knives are displaced outwardly against the centrifugal force acting on it, so that the end of a stalk can be placed into the opening of the disc. When the stalk is in the opening the braking action of said part is stopped and by the centrifugal force said knives will move toward the axis of rotation. By the presence of the stalk said movement is counteracted at a predetermined moment and when the stalk is shifted further the knives out the sprouts from the stalk. Behind the disc the stalk which is freed from sprouts, is picked up by driven rolls, which pull the stalk through the disc.

U.S. Pat. No. 3,410,272 (Van Den Hemel) discloses an apparatus for removing sprouts from a brussels sprouts plant wherein the knives are moved outwardly, away from the central opening, upon rapid disc rotation due to the centrifugal force exerted upon the knives and associated linkage mechanisms. The cutter head speed must be decreased before the knives are moved inwardly to contact the sprouts.

The person operating these machines has to put into action a brake everytime a stalk is to be shifted into the machine and, after the end of the stalk is shifted in, he has to render said brake inoperative again. Indeed, some have tried to remove this objection by providing electronic means which observe the presence of a stalk just before the opening and then put the brake into action, while then after a certain period of time said braking action is halted, but this requires a complicated and expensive device, which is sensitive to disturbances.

The present invention now removes this disadvantage by providing a cutter head for a machine for picking sprouts of the type indicated above from which machine the operating means comprise closing elements, which, as long as no stalk is shifted into or through the opening, will close the cross-sectional plane of the opening, and when a stalk is shifted in, the closing elements are pressed outwardly by the stalk and will move the knives toward the stalk by said outward movement.

Accordingly, a very simple device, can be utilized which comprises considerably less parts than the known device. Also, the costs of it are considerably lower and both the maintenance and operation are cheaper.

According to a preferred embodiment of the invention said closing members are provided at the ends of arms, the other ends of which are pivotally connected with to the disc. Connecting means are present between the arms and the elements which bear the knives, such that by the swinging movement of the arms, occurring when a stalk is pressed against the closing elements so that the closing elements move away from each other, the knives are urged towards each other and will engage the stalk.

Just as with the known devices, the knives will preferably be mounted in front of the disc, as seen in the direction of shifting in of the sprouts cabbage to be picked, and the closing elements will be provided behind the disc. In this case the stalk to be picked will be present in the opening in the disc before it contacts the closing means, which move the knives toward the stalk, so that the stalk is fed through the opening in the disc before the pressing in force exerted on it has to be transmitted to the closing means. So there will be hardly any risk of breaking a stalk by the force exerted on it.

The connecting means between the arms whic bear the closing elements and the elements bearing the knives will comprise resilient means, so that the closing elements, when the knives are in engagement with the stalk, can be moved away from each other farther without the knives being pressed into the stalk.

When the sprouts must be removed from a thick stalk, the closing elements will be moved far away from each other, while the knives need to go inward over only a small distance to cut the sprouts from the stalk. By applying the resilient means this proves not to cause any difficulties.

Preferably the closing elements will be formed by the parts of a hollow conical shell, which parts must be radially pressed away from each other, the hollow side of said conical parts being directed toward the stalk to be shifted in, said parts being formed by dividing the conical shell along subsstantially descriptive lines.

By this embodiment, the closing elements can very easily be pressed away from each other, so that no considerable force has to be exerted on the stalk when it is shifted into the machine. By this thin stalks breakage is avoided. Furthermore it is obtained that when the device is in its non-operating condition, the closing elements are in close engagement with each other such that, when a thin stalk is shifted in, the closing elements are pressed outwardly far enough to move the knives such that they engage the stalk. By this not only are the sprouts well cut, but it appears also that the leaves etc., present on the top of the stalk, are cut almost completely from the stalk and can easily be separated from the sprouts.

According to a further embodiment of the invention the concial shell is divided into two symmetrical portions, which are mutually displaced relative to each other in the position in which they are in engagement with each other in the plane of intersection, in such a way, that when the cutter head is rotated, the foremost descriptive line of the one conical shell portion is nearer to the centerline of the opening in the disc than the last descriptive line of the other conical shell portion.

When the stalk is shifted in, it engages the two front edges of the two conical shell portions, by which pressing away said portions becomes very easy.

According to a preferred embodiment the arms bearing the two conical shell portions are pivotable about axes which lie in the intersectional plane of the two conical shell portions.

In this way the conical shell portions, when they are pressed away from each other over a considerable distance, appear to co-operate in the most favourable way with the stalk which has been shifted in.

According to a further embodiment of the invention each of the two arms bearing a conical shell portions, is resiliently connected directly or indirectly with a member connecting the knive bearing elements with each other, so that all knives carry out the same relative movement.

By mutually coupling the knives, more than two knives can be applied when only two conical shell portions are present. Generallly the use of more than two knives is preferred in connection with the desired speed of the stalk going through the cutter head and in connection with the forces exerted by the knives on the stalk. The coupling between the knives gives the advantage that the knives are centered relative to the opening in the disc, by which also the stalk is centered relative to the disc and so the free end of it will not make uncontrollable movements.

According to a further embodiment of the invention each element bearing a knife is connected with a chain wheel, the element and the chain wheel being pivotable about a common axis and that over all chain wheels one common chain is running.

Because the chain has to be moved to and from only over a small distance, the ends of the chain can be connected with each other by a tension element, so that no further constructions are required to keep the chain tensioned.

Instread of a chain of course other coupling means can be applied, too, such as e.g. bars or the like, but these will generally take more space.

Between each of the arms which bear a conical shell portion and a secondary arm which is pivotable about the same axis, which secondary arm is connected with a chain wheel which meshes with the chain, a compression spring can be provided on a distance member that limits the angle between the arms to a maximum value such that the conical shells can be pressed farther away from each other against the working of the compression spring even when the chain wheels cannot rotate further because the knives connected with them are engaging the stalk.

Herewith the chain wheels, bearing the secondary arms, can be separate chain wheels and hence be provided on separate axes of rotation and they can have a diameter deviating from the diameter of the chain wheels connected with the elements bearing the knives. By this method a certain angular rotation of the arms bearing the conical shell portions, can be converted into another angular displacement of the elements bearing the knives. It is true that this advantage involves a more complicated device, because the disc has to be provided with additional pivot shafts or such like.

A simple embodiment can also be obtained by providing a tension spring between each of the arms, that bear a conical shell portion and a member interconnected with the chain. When the conical shell portions are removed from their closed position by shifting in a stalk to be picked, the spring puts the chain into movement so that the knives are brought toward the stalk and when the knives are in engagement with the stalk the spring can be stretched so that the conical shell portions can move farther away from each other.

By this a very simple embodiment is obtained with a minimum number of parts, because the spring itself serves for coupling the movement of the conical shell portions and of the knives.

To keep the device always ready for operation, the closing means must be brought into their closed position and this can e.g. be done by means of the centrifugal force. Just as in the known device the centrifugal force can act upon the elements bearing the knives, but now the knives are brought outwardly, in which position they have no cutting activity. By this the rotational speed of the disc is less critical since it has to be only great enough to that the knives take their non-active position. With the known device, however, the centrifugal force must be so great that the knives are pressed against the stalk in which position they have to execute their cutting activity. In practice it provides that pollution can occur by which the swinging movement of the parts is hindered and the centrifugal force may become insufficient to operate the device.

With the device according to the present invention this can easily be met in that the closing elements are brought toward their closed position by means of one or more springs.

In practice it proves not to cause any difficulties that said springs oppose the pressing away from each other of the closing elements, since the springs do not need to exert large feedback forces.

The invention will become more apparent from the following description taken in conjunction with the drawings wherein.

Figure 1:
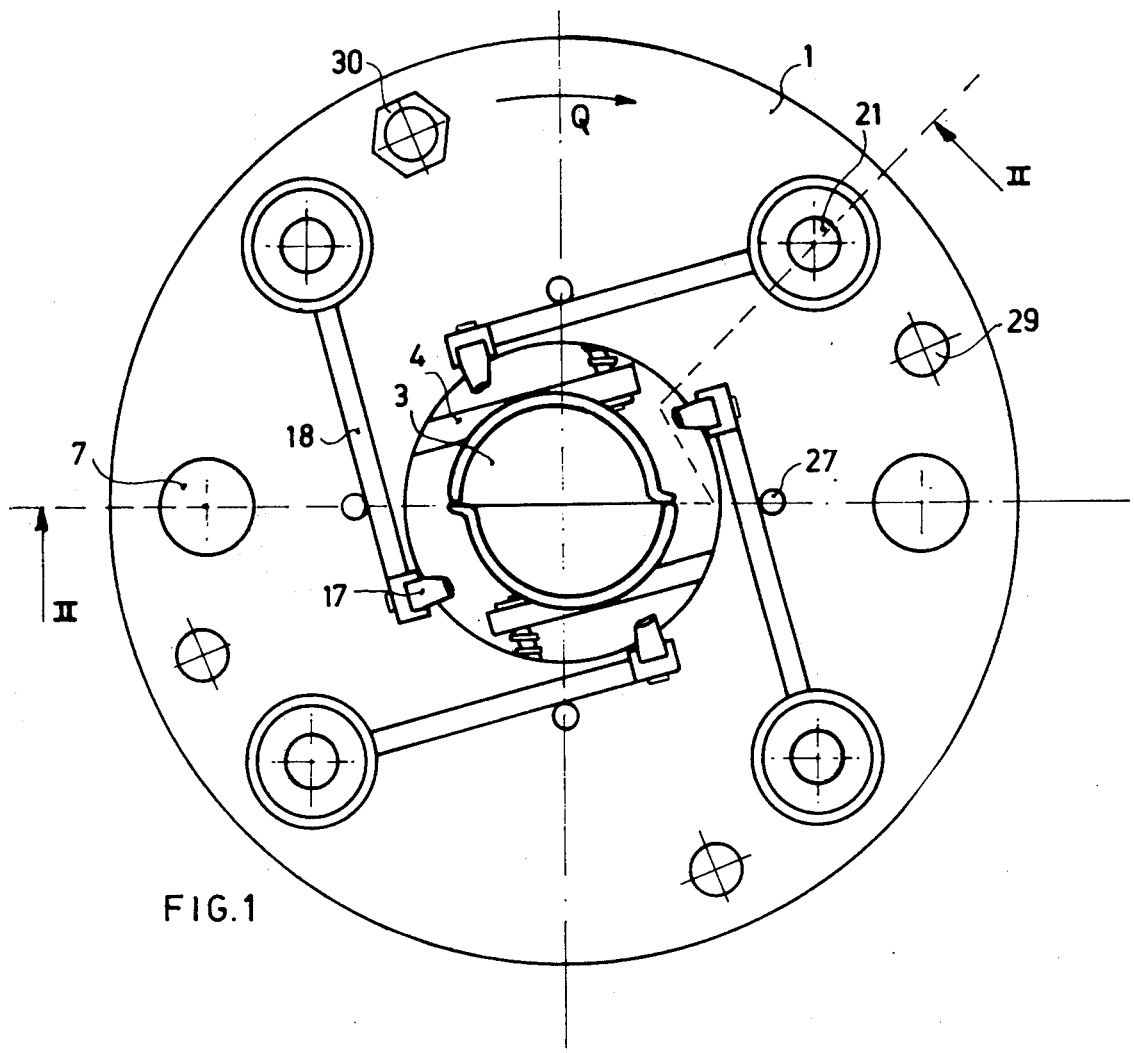
FIG. 1 is a view of a cutter head according to the present invention, seen from the side where the stalk to be picked is shifted into the head.

In both embodiments shown in the drawing the cutter head consists of a disc 1, which in a way which will be described later, is rotatably mounted in the sprouts-picking machine.

Figure 2:
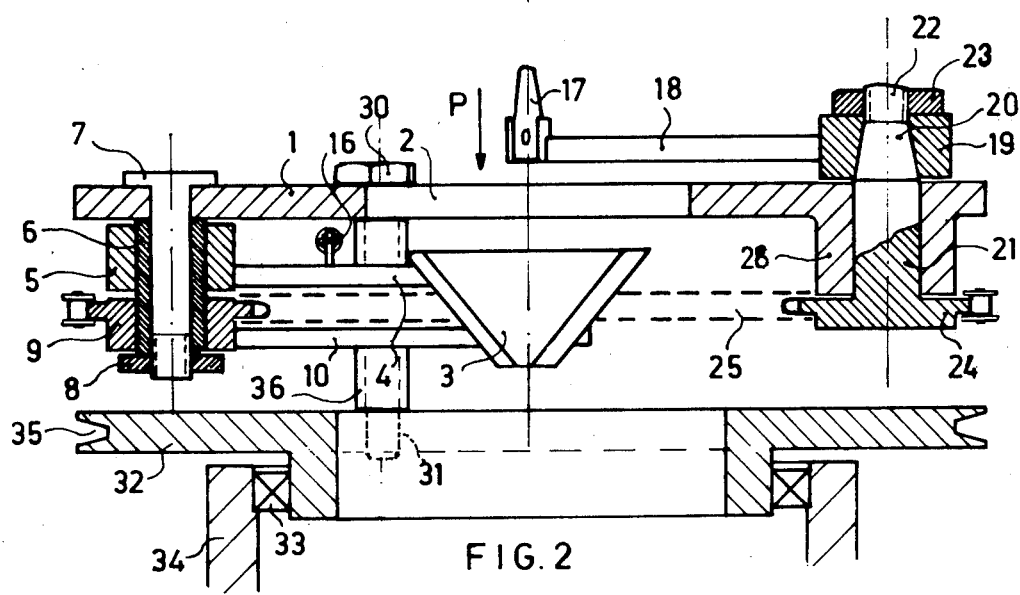
FIG. 2 is a section along the line II—II of FIG. 1 in which, for clearity's sake, certain parts have been omitted.

Disc 1 is provided with a central opening 2, in which a stalk to be picked can be shifted, namely in the direction of arrow P as indicated in FIG. 2. When shifting in the stalk the front end of it engages the two conical shell portions 3.

Figure 3:
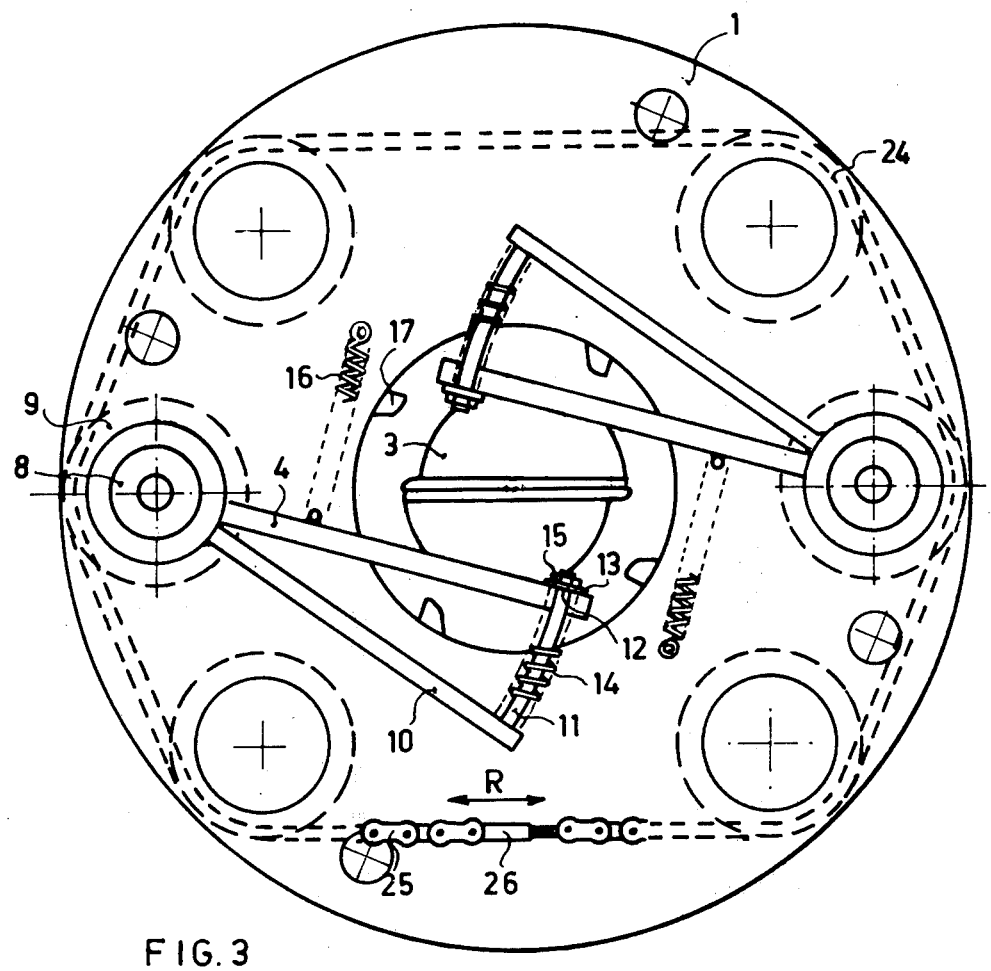
FIG. 3 is a rear view of the head of FIG. 1.

In the embodiment according to FIGS. 1-3 the conical shell portions 3 are mounted on arms 4. Each arm 4 is connected with a sleeve 5, which is pivotable on a bushing 6, which by means of the bolt 7 and the nut 8 is fixed on the disc 1. On the bushing 6 furthermore chain wheel 9 is rotatably mounted and the hub thereof is connected with an arm 10, the free end of which bears a somewhat bent pin 11. The free end of the pin 11 projects through a bore 12 into a lip 13, mounted to the arm 4. On the pin 11 a coil spring 14 is present, the one end of which is bearing against the arm 10 and the other end thereof bears against the lip 13. The coil spring 14 tries to press the arms 4 and 10 away from each other, but this is opposed by the nut 15, which is screwed on the end of the pin 11.

The arms 4 are urged towards each other by means of tension springs 16, so that the conical shell portions 3 will engage each other, when no stalk is present in the cutter head.

At the front side of the disc 1, thus as the side from which the stalks are shifted into the device, the knives 17 are present. Each of the knives 17 are mounted on an arms 18, connected with a ring 19, which internally is conical and which is clamped on an also conically shaped portion 20 of a shaft 21, the end of which is provided with screw-thread 22. Clamping the ring 19 takes place by means of the nut 23. The other end of the shaft 21 bears a chain wheel 24, which are shown as being formed by one part but which of course can be separate elements being connected with each other.

As appears, more specificaly from FIG. 3 a chain 25 runs over the chain wheels 9 and 24, the ends of which are connected by means of a tension element 26. Said tension element 26 causes no difficulties, since the chain moves to and fro over a relatively short distance, as indicated by arrow R in FIG. 3.

For each of the arms 18 a pin 27 serving as a stop member is provided on disc 1. By the mutual coupling of the arms 18 and 4 via the chain wheels 24 and 9 and the chain 25, the two conical shell portions 3 are centered relative to the disc, even when the tensile forces of the two springs are somewhat different.

Providing a stop member 27 for each of the arms 18 gives, when assembling the cutter head, the advantage, that the conical rings 19 of the arms 18 can easily by clamped on the shafts 21 in the right position.

As appears from the FIGS. 1 and 3 the intersectional plane between the conical shell portions 3 passes through the centerlines of the bolts 7, that comprise the shafts relative to which the conical shell portions 3 are pivoted. Furthermore, the conical shell portions 3 are displaced somewhat relative to each other in the said separation plane. When the direction of rotation of the disc 1 in FIG. 1 is indicated by arrow Q the foremost descriptive line of each of the conical shell portions 3 will first contact a stalk which is shifted into the device thus prssing away the conical shell portions 3. Furthermore, it will be clear that the foremost descriptive lines of the conical shell portions are a bit rounded so that no cutting activity is exerted on the shifted-in stalk. As appears more in particular from FIG. 2 the cavity formed by the conical shell portions almost tapers to one point, but the walls forming the conical shell are cut off according to a plane parallel to the disc, so that no sharp angles originate. It is of course also possible to form the end edges of the two conical shell portions in somewhat hollow fashion so that said end edges somewhat embrace the stalk that is pressing the elements away from each other.

When, starting from the position of the device as shown in the FIGS. 1–3, a stalk is shifted between the knives 17 into the opening 2 of the disc 1, the front end of the stalk engages the conical shell portions 3 and more in particular the foremost descriptive lines thereof, as explained above. Via the conical shell portions 3 the arms 4 are pressed away from each other and the latter take, via the compression springs 14, the arms 10 along, by which the chain wheels 9 are rotated. Via the chain 25 the chain wheels 9 take along the chain wheels 24, by which the arms 18 with associated knives 17 are displaced inwardly, hence toward the centerline of the disc 1.

When the stalk is a thin one, the conical shell portions 3 will be pressed outwardly over only a small distance, so that also the knives will be displaced over a small distance, but then will have to engage the stalk, so that the sprouts will be cut from the stalk. When a thicker stalk is shifted into the device, the conical shell portions 3 will be pressed further away from each other. If, however, the knives 17 bear against the stalk, the chain wheels 24 and hence also the chain wheels 7 will not rotate further, but the arms 4 still can be displaced outwardly further, because the coil springs 14 are compressed. The position of the knives 17 will be such that they will easily slide over the surface of the stalk and only will cut the projecting sprouts therefrom.

As was already said above, the front end of a stalk is, immediately upon leaving the conical shell portions 3, picked up by driven rolls, which pull the stalk through the cutter head and have not been indicated further since they form part of the known machine.

As soon as the stalk has left the conical shell portions 3 the arms 4 will, by the springs 16, be drawn back to their starting position. Via the pins 11, the arms 10, the chain wheels 9 and the chain 25 the chain wheels 24 are rotated, so that the arms 18 with the knives 17 will also return to their starting position, against the stop members 27.

To rotate the knives 17 over a greater angle inwardly than the angle over which arms 4 rotate outwardly, the chain wheels 9 can have a greater number of teeth than the chain wheels 24. If this is not necessary the arms 10 can also directly be connectd with two chain wheels 24 and the sleeves 5 can be mounted pivotably on the disc, e.g. on a hub portion 28, in which the shaft 21 pivots so that the disc is provided with only four pivots and hence also with only four chain wheels in total.

In FIG. 2 it is further schematically shown how the cutter head according to the present invention can be provided in a sprouts-picking machine. For this purpose the disc 1 is provided with bores 29, (FIG. 1), through which bolts 30 can be screwed into threaded bores 31 of a disc 32, which by means of a bearing 33 is rotatably supported by the supporting frame 34 of the machine. The disc 32 can e.g. be provided with a groove 35 for a V-rope (not shown), for rotating the disc 32.

On the bolt 30 a sleeve 36 is present for adjusting the distance between the discs 1 and 32.

It is clear that in the frame of the machine rotatable rolls also can be applied for supporting the disc 32 and that driving the disc can e.g. also take place by means of gear wheels and the like.

Preferably the construction will be such that the cutter head is easily removable from the machine, by which the maintenance and repairs of it are easy.

Figure 4:
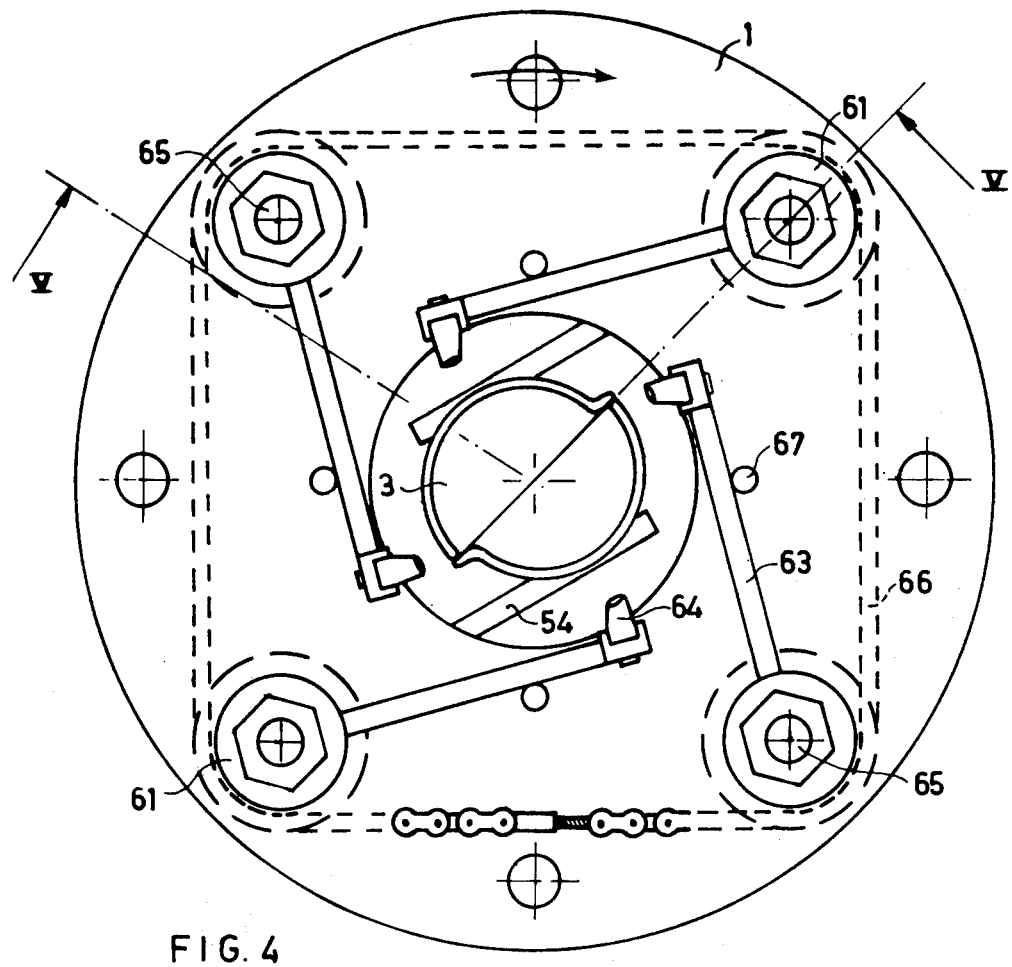
FIG. 4 is a view according to FIG. 1, but of another embodiment of the head.
Figure 5:
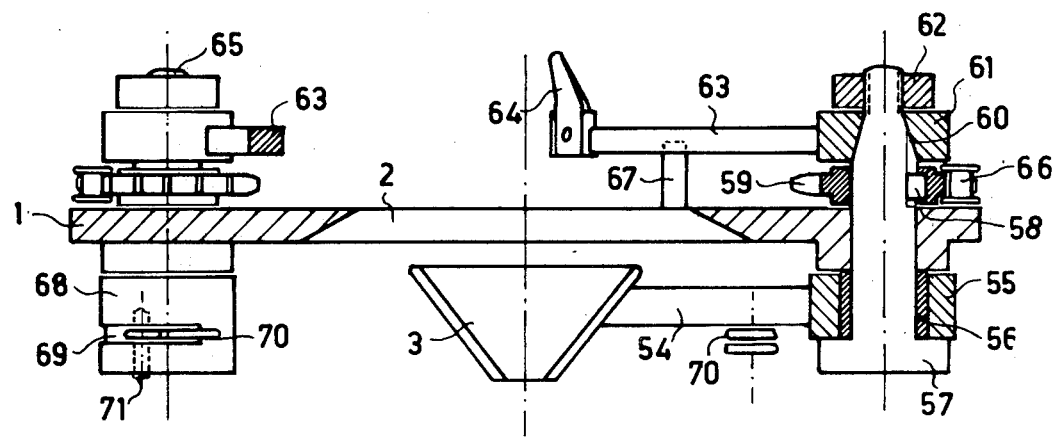
FIG. 5 is a section along the line V—V of FIG. 4.
Figure 6:
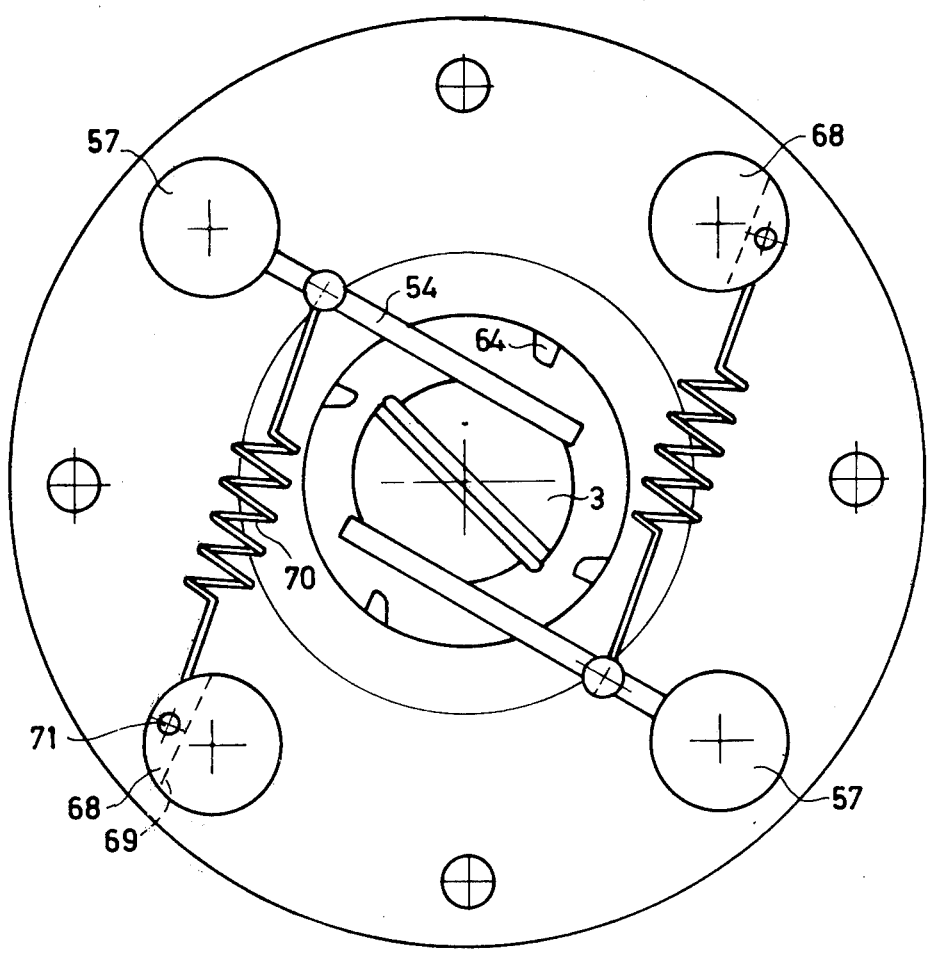
FIG. 6 is a rear view of the head of FIG. 4.

The embodiment shown in the FIGS 4–6 again comprises the disc 1 with the central opening 2 and the conical shell portions 3 present behind it.

The conical shell portions 3 now are mounted to arms 54, which are connected with sleeves 55, which via bushings 56 are pivotable on shafts 57, which again are pivoted to the disc 1. At the other side of the disc 1 the shaft 57, by means of a key 58, bears a chain wheel 59. The shaft 57 is, apart from the portion bearing the chain wheel 59, provided with a conical shaped portion 60, on which a correspondingly shaped ring 61 can be clamped by means of a nut 62. An arm 63 is connected with the ring 61 and bears at its other end the knife 64.

The above-described construction holds for the two pivots bearing the arms 54 with the conical shell portions 3. With the other two pivots use is always made of a shaft 65, which again is pivoted to the disc 1. The portion of the shaft 65 positioned above the disc 1 is formed in the same way as that of the shaft 57, so that use can be made of the same parts 58–64 as with the other pivot.

Over the four chain wheels, two of which are present on shafts 57 and two on shafts 65, the chain 66 runs, for coupling the chain wheels 59 with each other and by this the knife carrying arms 63. When assembling the cutter head the arms 63 with the rings 61 are shifted on the shafts after mounting the chain wheels 59 and the chain 66. Then all the arms 63 are placed against the stop members 67 and the arms are tightened to the shafts by means of the nuts 62.

The other end of the shafts 65 is provided with a head 68, with a groove for receiving the end of a spring 70 in it. The spring 70 can e.g. be provided with an eye, through which a bolt 71 is passed, which is screwed in the head 68.

The other end of the spring 70 is e.g. also by means of an eye and a bolt connected with the arm 54. The spring 70 has in its rest position such a length, that the conical shell portions 3 will bear against each other exactly when the arms 63 are bearing against the stop members 67. If the conical shell portions 3 are urged away from each other the arms 54 are swung outwardly. Each arm 54 rotates by means of the spring 70 the head 68 of the shaft 65. When rotating the shafts 65 the arms 63 connected with the shafts 65 will move inwardly and by chain 66 also the other two arms 63 are taken along. When the knives 64 are engaging the stalk to be picked, the conical shell portions can still move farther away from each other, due to the stretching action of spring 70.

Of course the head 68 need not be integral with the shaft 65 as the head and the shaft can be provided with conical shaped portions corresponding to the portion 60 and the ring 61, such that the head 68 can be adjusted to fit the actual length of spring 70.

In the embodiment shown it is possible to use the centrifugal force, acting upon the arms 63, for moving the knives 64 away from each other, by which movement the springs 70 will bring the elements 3 toward each other. The springs 70 then purely work as pushing bars. Of course it is also possible to provide coil springs such as springs 16 in FIG. 3 to bring the conical shell portions 3 toward each other and the knives 64 away from each other.

It will be clear that many constructional changes in the details of structure and arrangement may be resorted without departing from the principle of the invention. So the coupling between the four arms 18 or 63, which bear the knives, may also take place in another way than by means of the chain wheels and the chain.

What is claimed is:

1. A cutter head for a machine for picking sprouts from a stalk comprising a base having an opening into which said stalk is intended to be inserted in a generally axially downstream direction, means for rotating said base about said axis, a plurality of cutting elements mounted on said base and spaced apart from each other around said opening, sensing means carried by and rotatable with said base located downstream from said cutting elements for sensing the presence of a stalk in the opening, said sensing means being movable in response to the presence of a stalk, and actuating means connected to said sensing means for moving said cutting elements toward said axis to cut sprouts from a stalk detected by said sensing means and for moving said knives away from said axis when said stalk is removed from said sensing means.

2. A cutter head as recited in claim 1, wherein said sensing means comprises a plurality of closing elements.

3. A cutter head according to claim 2, said closng elements being brought toward their closed position by means of the centrifugal force.

4. A cutter head as recited in claim 2, wherein said cutting elements are pivotally mounted on shafts attached to said base.

5. A cutter head as recited in claim 4, wherein said actuating means include a plurality of arms each having one end in abutting relation to a closing element, the other end of said arm being attached to one of said shafts, said shafts being connected to chain wheels, and a chain engaging all of said chain wheels adapted to provide pivotal movement of said cutting elements toward and away from said axis in response to lateral movement of said arms.

6. A cutter head as recited in claim 5, wherein more shafts are provided than arms, so that some of said shafts do not have an arm end attached thereto, and further including spring means, one end of said spring means being attached to one of said arms, the other end of said spring means being attached to one of said shafts that does not have an arm end attached thereto, said springs adapted to transmit lateral motion of said arms to said chain wheels so that pivotal movement of said cutting elements is provided.

7. A cutter head as recited in claim 4, wherein said actuating means include a plurality of arms, a plurality of primary chain wheels, a plurality of secondary chain wheels, and a chain, each arm having one end in abutting relation to a closing element, and the other end being pivotally connected to said base, each of said pivotally connected ends being connected to one of said primary chain wheels, said shafts upon which said cutting elements are mounted connected to one of said secondary chain wheels, and a chain engaging all of said primary and secondary chain wheels adapted to provide a pivotal movement of said cutting elements toward and away from said axis in response to lateral movement of said arms.

8. A cutter head according to claim 7, further including a plurality of bars, distance members, and compression springs, each of said bars at one end thereof being attached to one of said arms by means of said distance member, said other end of each of said bars being attached to one of said primary chain wheels, said distance members being interposed between said bar and said arm, said compression springs being mounted on each of said distance members so that said closing elements can be farther pressed away from each other against the working of said compression springs when said cutting elements have already engaged said stalk.

9. A cutter head as recited in claim 7, further including tension springs, one end of said tension spring attached to said arm, the other end of said spring connected to said base so that said closing elements will move toward each other to close said opening when a stalk is no longer present therein.

10. A cutter head according to claim 7, said closing elements being formed by the parts of a hollow conical shell, which parts must mainly be pressed radially away from each other to provide pivotal movement of said cutting elements toward said axis, the hollow side of said conical parts being directed toward the stalk to be shifted in, said parts being formed by dividing the conical shell along substantially descriptive lines.

11. A cutter head according to claim 10, said conical shell portion being divided into two symmetrical portions, which are mutually displaced relative to each other in the position in which they are in engagement with each other in the plane of intersection, in such a way that when the cutter head is rotated the foremost descriptive line of the one conical shell portion is nearer to the centerline of the opening in the disc than the last descriptive line of the other conical shell portion.

12. A cutter head according to claim 11, said arms bearing the closing elements being pivotable about axes which lie in the intersectional plane of the two conical shell portions.

* * * * *